US009024598B2

(12) United States Patent
Hasegawa et al.

(10) Patent No.: US 9,024,598 B2
(45) Date of Patent: May 5, 2015

(54) CONVERTER CONTROL DEVICE

(75) Inventors: Takahiko Hasegawa, Toyota (JP); Nobuyuki Kitamura, Minamitsuru-gun (JP); Kota Manabe, Toyota (JP); Takahiro Umehara, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 97 days.

(21) Appl. No.: 13/379,917

(22) PCT Filed: Jun. 22, 2009

(86) PCT No.: PCT/JP2009/061314
§ 371 (c)(1),
(2), (4) Date: Dec. 21, 2011

(87) PCT Pub. No.: WO2010/150338
PCT Pub. Date: Dec. 29, 2010

(65) Prior Publication Data
US 2012/0098507 A1    Apr. 26, 2012

(51) Int. Cl.
*H02M 1/34*    (2007.01)
*H02M 1/32*    (2007.01)

(52) U.S. Cl.
CPC .. *H02M 1/32* (2013.01); *H02M 1/34* (2013.01)
USPC ........................... 323/272; 323/225; 361/93.9

(58) Field of Classification Search
CPC ................................. H02M 1/32; H02M 1/34
USPC ........... 323/271, 272, 225; 361/87, 93.9, 93.1
See application file for complete search history.

(56) References Cited

U.S. PATENT DOCUMENTS

| | | | | |
|---|---|---|---|---|
| 5,624,768 A | * | 4/1997 | Tanokura | ........................ 429/431 |
| 6,211,657 B1 | * | 4/2001 | Goluszek | ........................ 323/272 |
| 6,255,008 B1 | | 7/2001 | Iwase | |
| 7,279,868 B2 | * | 10/2007 | Lanni | ............................ 323/222 |
| 7,489,116 B2 | * | 2/2009 | Lanni | ............................ 323/222 |
| 7,605,574 B2 | * | 10/2009 | Dearn et al. | .................. 323/284 |

(Continued)

FOREIGN PATENT DOCUMENTS

| | | | |
|---|---|---|---|
| JP | 7-135013 A | 5/1995 | |
| JP | 8-021861 A | 1/1996 | |

(Continued)

OTHER PUBLICATIONS

International Search Report mailed Sep. 29, 2009 of PCT/JP2009/061314.

*Primary Examiner* — Gary L Laxton
*Assistant Examiner* — Kyle J Moody
(74) *Attorney, Agent, or Firm* — Kenyon & Kenyon LLP

(57) ABSTRACT

Provided is a converter control device which detects an on-failure of an auxiliary switch constituting an auxiliary circuit of a soft switching converter and can prevent element failures. A current sensor for detecting the current flowing in a coil is provided between a fuel cell and the. A controller sequentially detects current by use of the current sensor and makes a judgment as to whether or not the detected current has exceeded an overcurrent threshold value stored in a memory (not shown). When the controller judges that the current has exceeded the overcurrent threshold value, the controller judges that a second switching element has an on-failure, and performs a fail-safe operation by stopping the driving of a converter (for example, a U-phase converter) of an auxiliary circuit provided with this second switching element.

1 Claim, 19 Drawing Sheets

(56) References Cited

U.S. PATENT DOCUMENTS

| | | | |
|---|---|---|---|
| 7,710,088 B2* | 5/2010 | Komiya | 323/272 |
| 7,994,765 B2* | 8/2011 | Takada et al. | 323/282 |
| 8,344,712 B2* | 1/2013 | Martin et al. | 323/272 |
| 8,417,400 B2* | 4/2013 | Toth | 701/22 |
| 8,456,144 B2* | 6/2013 | Chatroux et al. | 323/235 |
| 2004/0124808 A1* | 7/2004 | Hirono | 318/806 |
| 2009/0183934 A1* | 7/2009 | Oyobe et al. | 180/65.265 |
| 2011/0020720 A1* | 1/2011 | Chatroux et al. | 429/431 |
| 2011/0316501 A1* | 12/2011 | Cervera et al. | 323/268 |
| 2012/0025791 A1* | 2/2012 | Abu Qahouq et al. | 323/271 |

FOREIGN PATENT DOCUMENTS

| | | |
|---|---|---|
| JP | 2000-036308 A | 2/2000 |
| JP | 2002-198792 A | 7/2002 |
| JP | 2006-042443 A | 2/2006 |
| JP | 2007-006669 A | 1/2007 |
| JP | 2005-102438 A | 5/2007 |
| JP | 2008-078447 A | 4/2008 |
| JP | 2008-079447 A | 4/2008 |
| JP | 2009-124880 A | 6/2009 |
| WO | 2006/098376 A1 | 9/2006 |

* cited by examiner

CONVERTER CONTROL DEVICE

This is a 371 national phase application of PCT/JP2009/061314 filed 22 Jun. 2009, the contents of which are incorporated herein by reference.

TECHNICAL FIELD

The present invention relates to a converter control device which controls the output voltage of a fuel cell.

BACKGROUND ART

For a fuel cell system mounted on vehicles and the like, there have been proposed various hybrid fuel cell systems provided with a fuel cell and a battery as a power source in order to cope with abrupt load changes and the like exceeding the power generation capacity of a fuel cell.

In a hybrid fuel cell system, the output voltage of the fuel cell and the output voltage of the battery are controlled by a DC/DC converter. As a DC/DC converter which performs such control, a type which performs the conversion of voltage by causing PWM operation of a switching element, such as a power transistor, an IGBT and an FET, is in widespread use. With power savings, downsizing and higher performance advancing in electronic equipment, it is desired that a DC/DC converter provide lower losses, higher efficiency and lower noises and in particular, the reduction of switching losses and switching surges that accompany PWM operations is desired.

There is a soft switching technique as one of the techniques for reducing such switching losses and switching surges. Soft switching is a switching method for realizing ZVS (Zero Voltage Switching) or ZCS (Zero Current Switching), and switching losses of a power semiconductor device and stresses given to the power semiconductor device are low. In contrast to this, the switching method which involves turning on and off voltage and current by the switching function of a power semiconductor device is called hard switching. In the following descriptions, the method by which both or one of ZVS and ZCS is realized is called soft switching, and other methods are called hard switching.

Soft switching is realized by a system in which an auxiliary circuit provided with, for example, an auxiliary switch for reducing switching losses is added to a general boost type DC/DC converter provided with a main coil, a main switch and a diode (what is called a soft switching converter)(refer to Patent Literature 1, for example).

CITATION LIST

Patent Literature

Patent Literature 1: Japanese Patent Laid-Open No. 2005-102438

SUMMARY OF INVENTION

Technical Problem

If an on-failure occurs in an auxiliary switch constituting an auxiliary circuit in such a soft switching converter, the auxiliary circuit becomes incapable of being controlled. As a result, soft witching cannot be realized, and in addition, an overcurrent is generated in a main coil, which may induce the overheating of an auxiliary circuit element.

The present invention was made in view of the situation described above, and the object of the invention is to provide a converter control device which detects on-failures of an auxiliary switch constituting an auxiliary circuit of a soft switching converter and can prevent the overheating of the auxiliary circuit element.

Solution to Problem

In order to solve the above-described problem, the converter control device of the present invention is a control device of a soft switching converter provided with a main booster circuit and an auxiliary circuit, which controls output voltage of a fuel cell, and comprises: a current sensor which detects current flowing in a main coil constituting the main booster circuit; judgment means which judges that an auxiliary switch constituting the auxiliary circuit has an on-failure when the current detected by the current sensor exceeds a set overcurrent threshold value; and fail-safe means which stops operation of the main booster circuit when it is judged that the auxiliary switch has an on-failure.

According to this configuration, when the current flowing in the main coil exceeds an overcurrent threshold value, it is judged that there is an on-failure, and the control proceeds to a fail-safe operation for stopping the operation of the main booster circuit, with the result that it becomes possible to prevent problems such as element fractures.

And in a preferred feature, in the above-described configuration, the soft switching converter is a multiphase soft switching converter which is provided with the main booster circuit and the auxiliary circuit for each phase, the current sensor detects the current flowing in the main coil for each phase, the judgment means judges for each phase whether or not the auxiliary switch has an on-failure, and the fail-safe means stops the driving of a phase for which the auxiliary switch has been judged to have an on-failure and perform driving using remaining phases.

Furthermore in a more preferred embodiment, in the above-described configuration, the overcurrent threshold value is set on the basis of a duty command given to the main coil, an output current of the fuel cell, and an output voltage of the fuel cell.

Moreover in a more preferred embodiment, in the above-described configuration, the main booster circuit has: the main coil one end of which is connected to a terminal on a high-potential side of the fuel cell; a main switch which performs switching, one end of which is connected to the other end of the main coil and the other end of which is connected to a terminal on a low-potential side of the fuel cell; a first diode whose cathode is connected to the other end of the main coil; and a smoothing capacitor provided between the anode of the first diode and the other end of the main switch. The auxiliary circuit has: a first series-connected body including a second diode and a snubber capacitor which are connected in parallel to the main switch and connected to the other end of the main coil and a terminal on the low-potential side of the fuel cell; and a second series-connected body including a third diode, an auxiliary coil and the auxiliary switch which are connected between a connecting portion between the second diode and the snubber capacitor and one end of the main coil.

Besides, another converter control device of the present invention is a control device of a soft switching converter provided with a main booster circuit and an auxiliary circuit, which controls output voltage of a fuel cell, and comprises: a temperature sensor which detects a temperature of at least any one of elements of a main coil constituting the main booster circuit, and an auxiliary coil and an auxiliary switch constituting the auxiliary circuit; and judgment means which judges that the auxiliary switch constituting the auxiliary circuit has an on-failure when the temperature detected by the temperature sensor exceeds a set threshold temperature.

In addition, a further converter control device of the present invention is a control device of a soft switching converter provided with a main booster circuit and an auxiliary circuit, which controls output voltage of a fuel cell, and comprises: a current sensor which detects an output current of the soft switching converter; and judgment means which judges that an auxiliary switch constituting the auxiliary circuit has an on-failure when the current detected by the current sensor does not exceed a set normal current threshold value.

Advantageous Effect of Invention

According to the present invention, it is possible to detect on-failures of an auxiliary switch constituting an auxiliary circuit of a soft switching converter and to prevent the overheating of an auxiliary circuit element.

DESCRIPTION OF EMBODIMENTS

A. Present Embodiment

Figure 1:
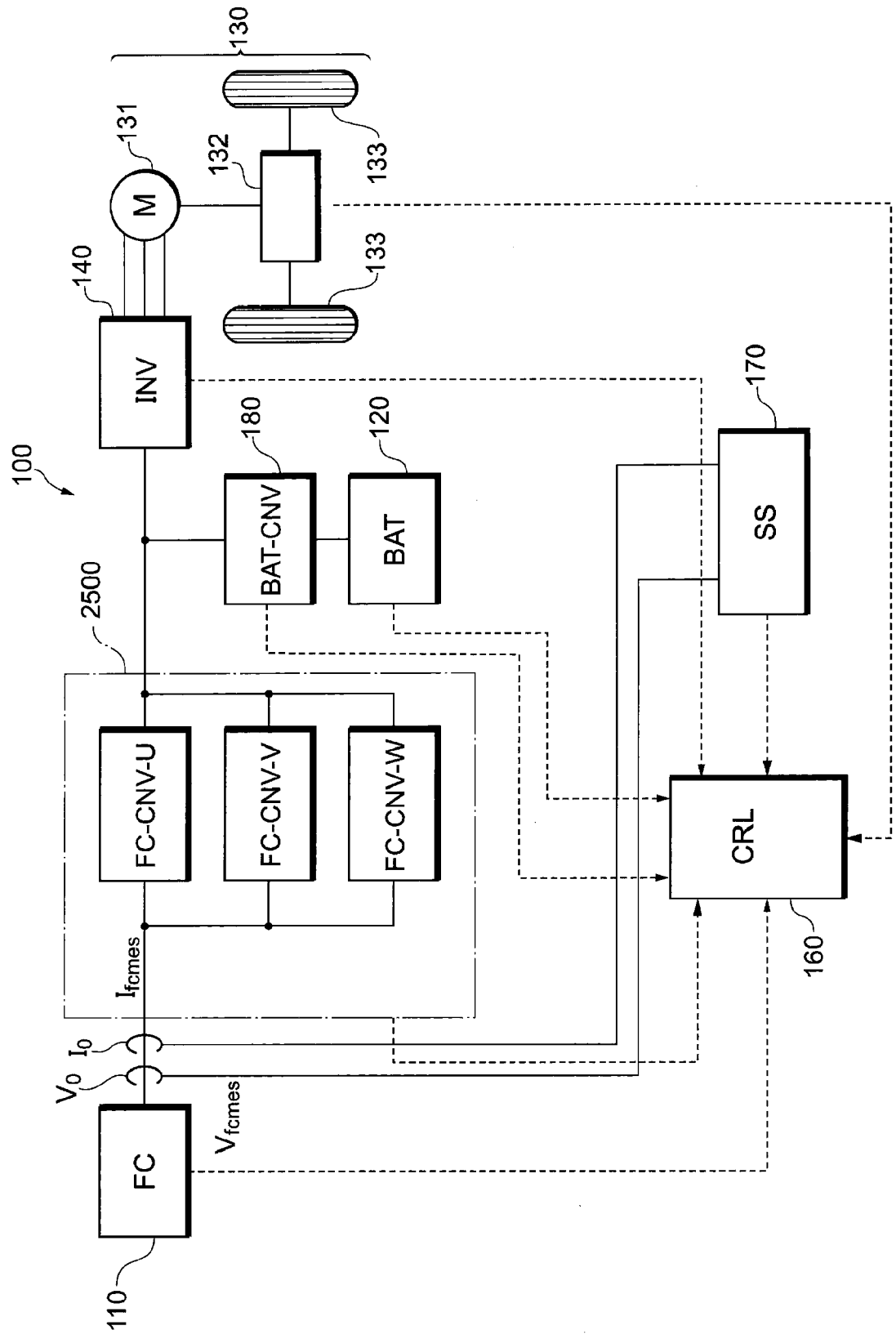
FIG. 1 is a system configuration diagram of an FCHV system of this embodiment.

Hereinafter, referring to each drawing, an embodiment of the present invention will be described. FIG. 1 shows the configuration of an FCHV system of this embodiment which is mounted on a vehicle. Although in the following description an FCHV (a Fuel Cell Hybrid Vehicle) is supposed as an example of a vehicle, this embodiment can also be applied to an electric vehicle and the like. And this configuration can be applied not only to a vehicle, but also to various kinds of mobile objects (for example, ship, airplane and robot), a stationary power source and furthermore to a portable fuel cell system.

A-1 General Configuration of System

In an FCHV system 100, an FC converter 2500 is provided between a fuel cell 110 and an inverter 140, and a DC/DC converter (hereinafter referred to as a battery converter) 180 is provided between a battery 120 and an inverter 140.

The fuel cell 110 is a polymer electrolyte fuel cell stack in which a plurality of unit cells are stacked in series. A voltage sensor $V_0$ for detecting the output voltage $V_{fcmes}$ of the fuel cell 110 and a current sensor $I_0$ for detecting the output current $I_{fcmes}$ are attached to the fuel cell 110. In the fuel cell 110, an oxidation reaction of Formula (1) occurs in the anode and a reduction reaction of Formula (2) occurs in the cathode. And an electrogenic reaction of Formula (3) occurs in the whole fuel cell 110.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

The unit cell has such a construction that an MEA obtained by sandwiching a polymer electrolyte membrane and the like with two electrodes, which are a fuel electrode and an air electrode, is held by a separator for supplying fuel gas and oxidation gas. The anode is such that a catalyst layer for anode is provided on a porous support layer, and the cathode is such that a catalyst layer for cathode is provided on a porous support layer.

The fuel cell 110 is provided with a system for supplying fuel gas to the anode, a system for supplying oxidation gas to cathode, and system for supplying the coolant (any of these is not shown), and it is ensured that desired power can be generated by controlling the supply volume of fuel gas and the supply volume of oxidation gas according to a control signal from the controller 160.

The FC converter 2500 plays the role of controlling the output voltage $V_{fcmes}$ of the fuel cell 110, and this is a bidirectional voltage converter which converts (boosts or steps down) the output voltage $V_{fcmes}$ inputted to the primary side (the input side: the fuel cell 110 side) into a voltage value different from that of the primary side and outputs the voltage to the secondary side (the output side: the inverter 140 side), or conversely, converts a voltage inputted to the secondary side into a voltage value different from that of the secondary side and outputs the voltage to the primary side. This FC converter 2500 controls the output voltage $V_{fcmes}$ of the fuel cell 110 to a voltage suited to a target output.

The battery 120 is connected in parallel to the fuel cell 110 with respect to a load 130, and functions as a storage source of surplus power, a regenerative energy storage source during regenerative braking, and an energy buffer during load variations resulting from the acceleration and deceleration of an FCHV. For example, a nickel-cadmium storage battery, a nickel-hydrogen storage battery and a secondary battery, such as a lithium secondary battery, are used as the battery 120.

The battery converter 180 plays the role of controlling the input voltage of the inverter 140, and has a circuit configuration similar to that of the FC converter 2500, for example. Although a boost type converter may be adopted as the battery converter 180, in place of this a buck-boost type converter, which can both boost and step down a voltage, may be adopted, and it is possible to adopt all configurations that permit the control of the input voltage of the inverter 140.

The inverter 140 is, for example, a PWM inverter which is driven by the pulse-width modulation method, converts the DC power outputted from the fuel cell 110 or the battery 120 into three-phase AC power at a control command from the controller 160, and controls the rotation torque of a traction motor 131.

The traction motor 131 provides the main driving force of this vehicle and is adapted to generate regenerative power during deceleration. A differential 132 is a reduction gear, which decelerates the high-speed rotation of the traction motor and rotates a shaft for which a tire 133 is provided. The shaft is provided with a wheel speed sensor and the like, which are not shown, and the vehicle speed and the like of the vehicle in question are detected thereby. In this embodiment, all equipment (including the traction motor 131 and the differential 132) that operates by receiving the power supplied from the fuel cell 110 is called a load 130.

The controller 160 is a computer system for controlling the FCHV system 100, and is provided with, for example, a CPU, a RAM and a ROM. The controller 160 finds the power demand of the load 130 (i.e., the power demand of the whole system) by inputting various kinds of signals supplied from a sensor group 170 (for example, a signal indicating the accelerator opening or a signal indicating the speed of the vehicle, and a signal indicating the output current or the voltage at the output terminal of the fuel cell 110).

The power demand of the load 130 is, for example, a sum value of vehicle driving power and auxiliary machine power. The auxiliary machine power includes the power consumed in vehicle-mounted auxiliary machines (humidifier, air compressor, hydrogen pump, cooling water circulation pump and the like), devices necessary for vehicle driving (transmission gear, wheel control device, steering apparatus, suspension device and the like), the devices used in the passenger space, and the like (air conditioner, lighting fixtures, audio instruments and the like).

And the controller (converter control device) 160 determines the distribution of the output power for the fuel cell 110 and the battery 120, and computes a power generation instruction value. After the controller 160 finds the power demand for the fuel cell 11 and the battery 120, the controller 160 controls the operation of the FC converter 2500 and the battery converter 180 so that the power demand can be obtained.

A-2 Configuration of FC Converter

As shown in FIG. 1, the FC converter 2500 has a circuit configuration as a three-phase resonance type converter composed of the U-phase, V-phase and W-phase. The circuit configuration of the three-phase resonance type converter is such that an inverter-like circuit portion which first converts inputted DC voltage into an alternating current and a portion which again rectifies the alternating current and converts the alternating current into different DC voltage are combined. In this embodiment, a multiphase soft switching converter provided with a free-wheel circuit (the details will be described later) (hereinafter referred to as the multiphase FC soft switching converter) is adopted as the FC converter 2500.

A-2-1 Description of Multiphase FC Soft Switching Converter

Figure 2:
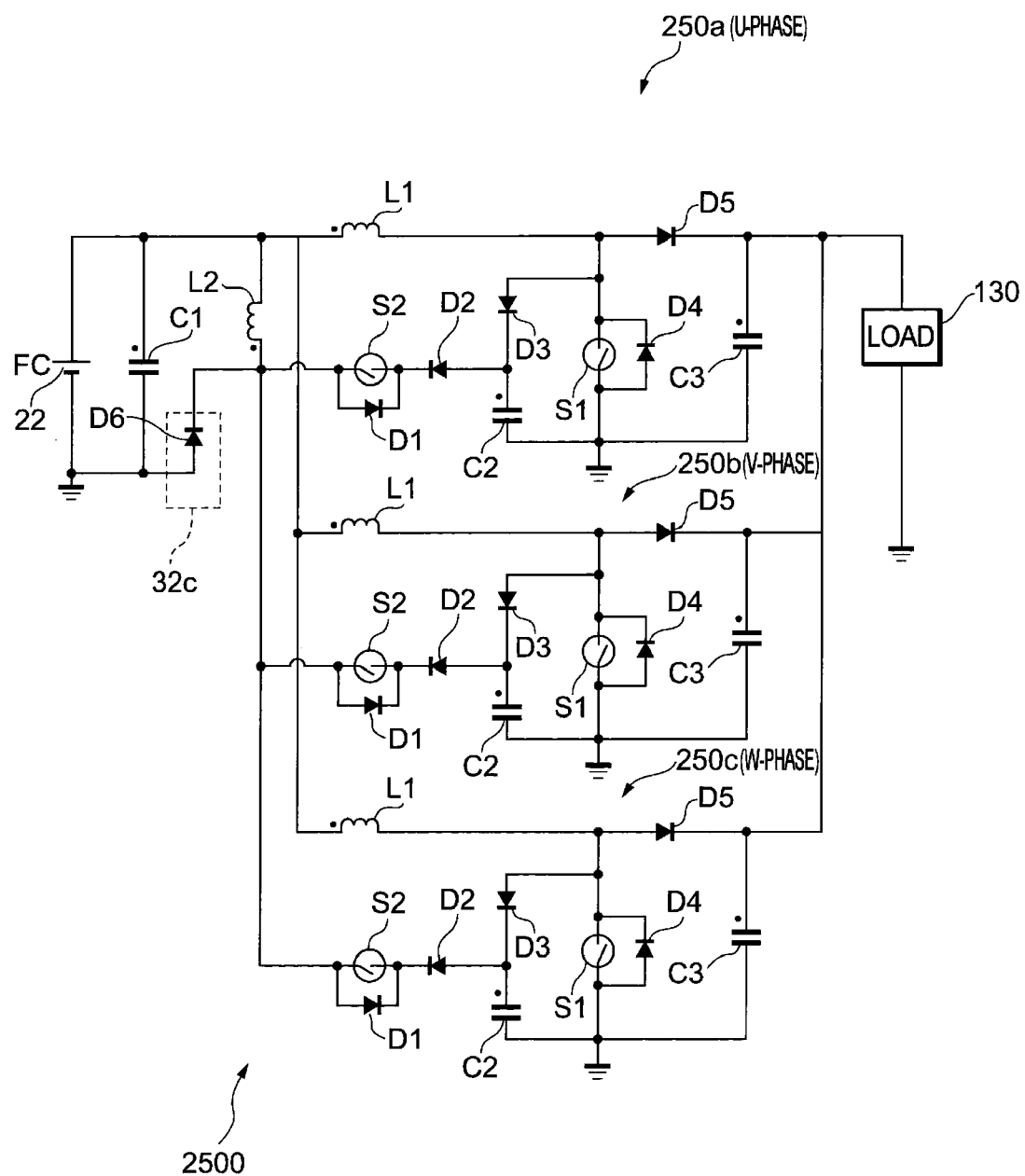
FIG. 2 is a diagram showing the circuit configuration of a multiphase FC soft switching converter of the embodiment.
Figure 3:
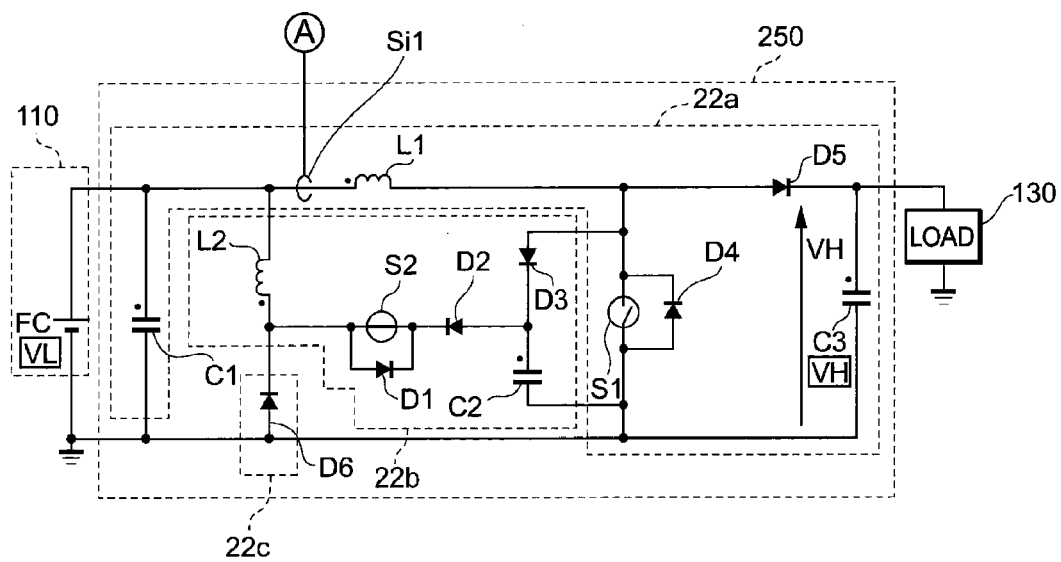
FIG. 3 is a diagram showing the configuration of one phase of an FC soft switching converter of the embodiment.

FIG. 2 is a diagram showing the circuit configuration of the multiphase FC soft switching converter 2500 mounted on the FCHV system 100, and FIG. 3 is a diagram showing the configuration of one phase of the multiphase FC soft switching converter 2500.

In the following descriptions, the U-phase, V-phase and W-phase FC soft switching converters constituting the multiphase FC soft switching converter 2500 are called the FC soft switching converters 250a, 250b and 250c, respectively, and when a classification is not especially necessary, these FC soft switching converters are called simply the FC soft switching converter 250. And the voltage before boosting which is inputted to the FC soft switching converter 250 is called the converter input voltage Vin, and the voltage after boosting which is outputted from the FC soft switching converter 250 is called the converter output voltage $V_{out}$.

As shown in FIG. 3, each of the FC soft converters 250 is provided with a main boost circuit 22a for performing a boosting operation, an auxiliary circuit 22b for performing a soft switching operation, and a free-wheel circuit 22c.

The main boost circuit 22a boosts the output voltage of the fuel cell 110 by releasing the energy stored in a coil L1 into the load 130 via a diode D5 through the use of the switching operation of a first switching element S1 comprising an IGBT (Insulated Gate Bipolar Transistor) and the like and a switching circuit composed of a diode D4.

Entering into the details, one end of the coil L1 is connected to the high-potential side terminal of the fuel cell 110, one end of the first switching element S1 is connected to the other end of the coil L1, and the pole of the other end of the first switching element S1 is connected to the low-potential side terminal of the fuel cell 110. The cathode terminal of the diode D5 is connected to the other end of the coil L1, and furthermore, a capacitor C3 which functions as a smoothing capacitor is connected between the anode terminal of the diode D5 and the other end of the first switching element S1. The main boost circuit 22a is provided with a smoothing capacitor C1 on the fuel cell 110 side, and this enables the ripples of the output current of the fuel cell 110 to be reduced. Between the fuel cell 110 and the coil L1, there is provided a current sensor Si1 for detecting the current flowing in the coil L1.

Here, the voltage VH applied to the capacitor C3 becomes the converter output voltage $V_{out}$ of the FC soft switching converter 250, and the voltage VL applied to the smoothing capacitor C1 becomes the converter input voltage Vin of the FC soft switching converter 250, which is the output voltage of the fuel cell 110.

The auxiliary circuit 22b includes a first series-connected body which includes a clamp diode D3, which is connected in parallel to the first switching element S1, and a snubber capacitor C2 connected in series to this clamp diode D3. The first series-connected body is such that the cathode terminal of the clamp diode D3 is connected to the other end of the coil L1, and the anode terminal of the clamp diode D3 is connected to one end of the snubber capacitor C2. Furthermore, the other end of the snubber capacity C2 is connected to the terminal on the low-potential side of the fuel cell 110. There is provided a voltage sensor (not shown) which detects the voltage of both ends of the snubber capacitor C2.

Furthermore, the auxiliary circuit 22b includes a diode D2, a second switching element S2, a diode D1, and a second series-connected body which is composed of an auxiliary coil L2 common to each phase.

The second series-connected body is such that the anode terminal of the diode D2 is connecting to a connecting portion between the diode D3 of the first series-connected body and the snubber capacitor C2. Furthermore, the cathode terminal of the diode D2 is connected to the pole of one end of the second switching element (auxiliary switch) S2. And the pole of the other end of the second switching element S2 is connected to a connecting portion between the auxiliary coil L2 and the free-wheel circuit 22c. The anode terminal of a free-wheel diode D6 is connected to the low-potential side of the fuel cell 110, whereas the cathode terminal of the free-wheel diode D6 is connected to the auxiliary coil L2. This free-wheel circuit 22c is provided with the free-wheel diode D6 common to each phase, and is a circuit for realizing the fail-safe function provided to prevent the occurrence of surge voltage which might break the second switching element S2. The present invention can be applied also to a configuration which is not provided with the free-wheel circuit 22c.

In the FC soft switching converter 250 configured in this manner, the controller 160 adjusts the switching duty ratio of the first switching element S1 of each phase, whereby the boost ratio by the FC soft switching converter 250, i.e., the ratio of the converter output voltage $V_{out}$ to the converter input voltage Vin is controlled. Furthermore, the switching operation of the second switching element S2 of the auxiliary circuit 22b is caused to be involved in the switching operation of the first switching element S1, whereby soft switching is realized.

Figure 4:
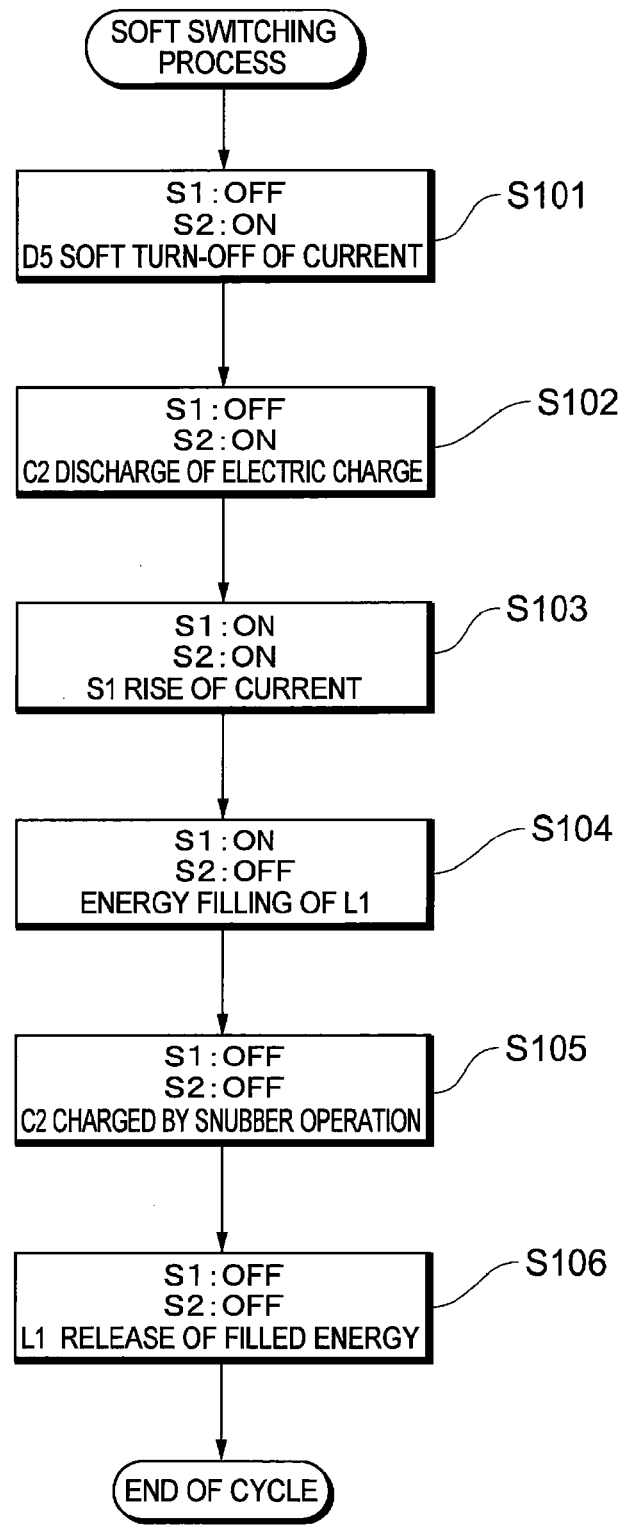
FIG. 4 is a flowchart showing the soft switching process.

Next, the soft switching operation by the FC soft switching converter 250 will be described with reference to FIG. 4 etc. FIG. 4 is a flowchart showing one cycle of processing of the FC soft switching converter 250 (hereinafter referred to as soft switching process) through the intermediary of soft switching operation, and the controller 160 sequentially executes steps S101 to S106 shown in FIG. 4, whereby one cycle is formed. In the following description, the modes in which the state of current and voltage of the FC soft switching converter 250 is presented are expressed by modes 1 to 6, respectively, and the state is shown in FIGS. 5 to 10. In FIGS. 5 to 10, the currents flowing in the circuits are indicated by arrows.

<Soft Switching Operation>

First, the initial state in which the soft matching process shown in FIG. 4 is performed is the state in which the power demanded by the load 130 is supplied from the fuel cell 110, that is, the state in which the first switching element S1 and the second switching element S2 are both turned off, whereby a current is supplied to the load 130 via the coil L1 and the diode D5.

Mode 1: See FIG. 5)

Figure 5:
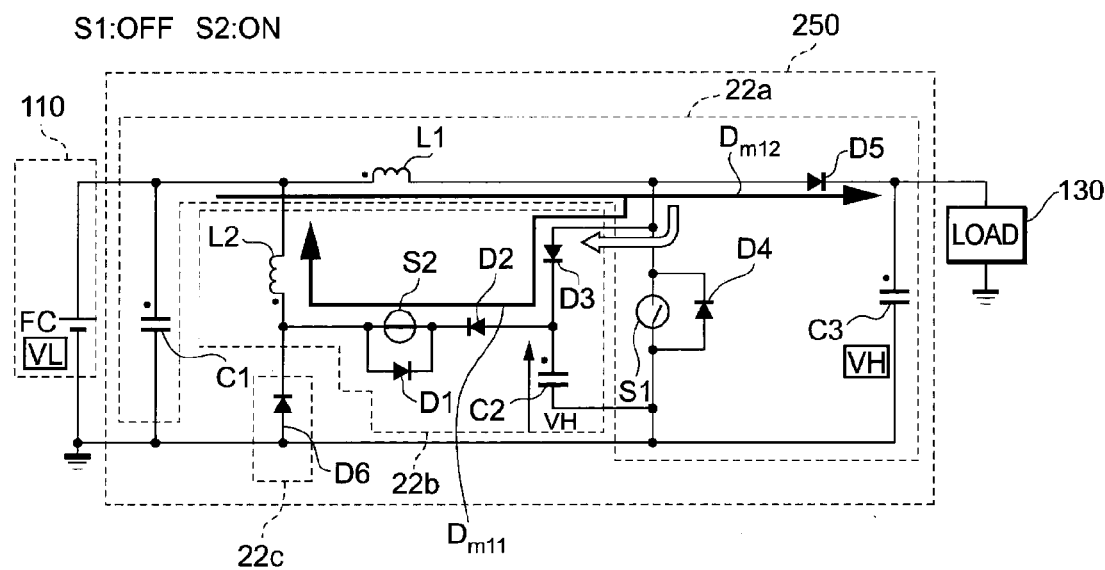
FIG. 5 is a diagram showing the operation of mode 1.

In Step S101, the turn-off of the first switching element S1 is held, while the second switching element S2 is turned on. When this switching operation is performed, the current flowing to the load 130 side moves gradually to the auxiliary circuit 22b side via the coil L1, the diode D3, the second switching element S2, and the auxiliary coil L2 because of a potential difference between the output voltage VH of the FC soft switching converter 250 and the input voltage VL. In FIG. 5, how the current moves from the load 130 side to the auxiliary circuit 22b side is indicated by an outline arrow.

And the circulation of current occurs in the direction of the arrow $D_{m11}$ shown in FIG. 5 by turning on the second switching element S2. Although the current change rate of the second switching element S2 increases according to the voltage at both ends (VH−VL) of the auxiliary coil L2 and the inductance of the auxiliary coil L2, the current flowing in the second switching element S2 is restrained by the auxiliary coil L2, with the result that the soft turn-off of the current flowing to the load 130 side via the diode D5 (see the arrow $D_{m12}$ shown in FIG. 5) is realized.

The transition time tmode1 from mode 1 to mode 2 is expressed by Formula (4) below:

$$tmode1 = \max\left(I_p - \frac{\Delta I}{2} \cdot 0\right) \times \frac{L2id}{(VH-VL)} \quad (4)$$

Ip: Phase current
L2id: Inductance of auxiliary coil L2

Mode 2: See FIG. 6)

Figure 6:
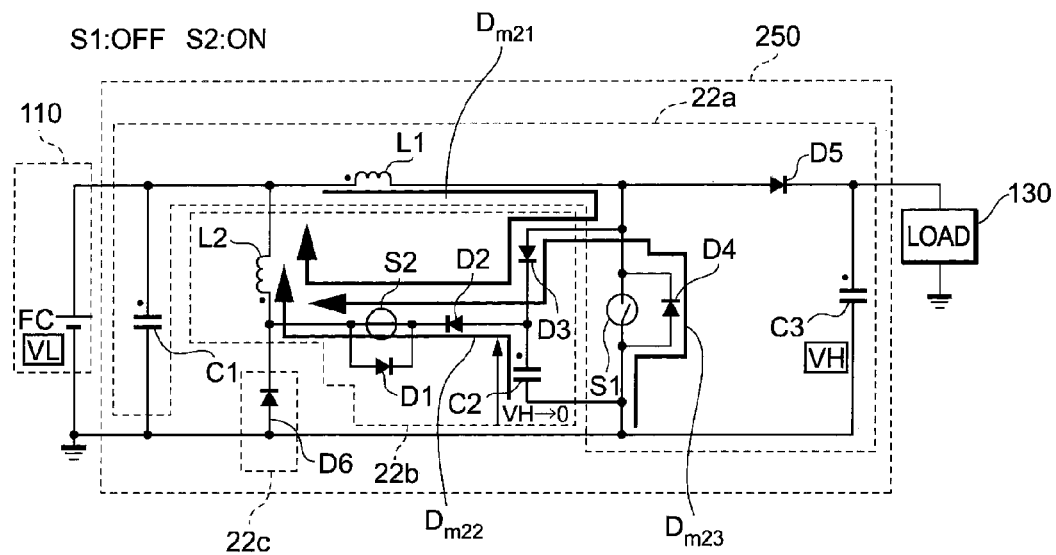
FIG. 6 is a diagram showing the operation of mode 2.
Figure 7:
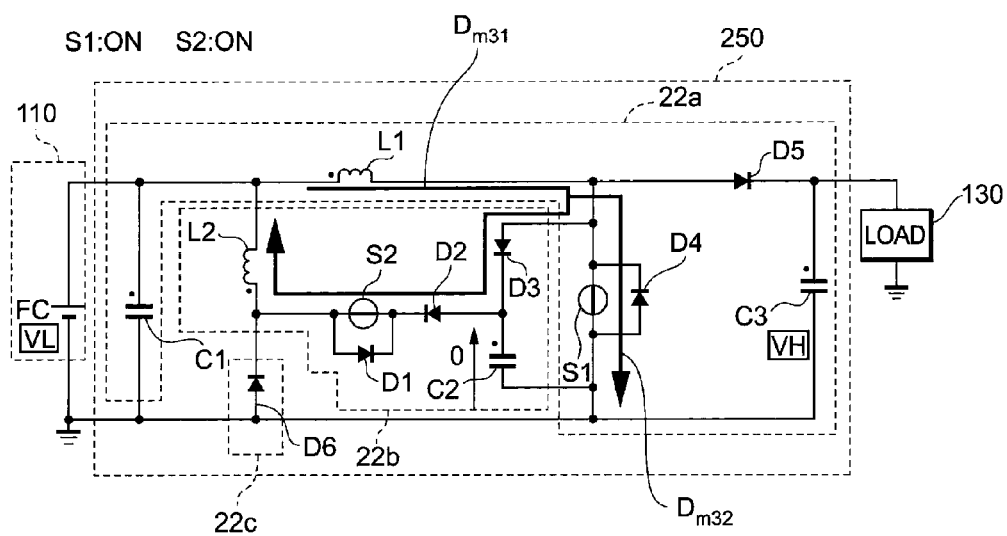
FIG. 7 is a diagram showing the operation of mode 3.

When the above-described transition completion time has elapsed and the flow of processing proceeds to Step S102, the current flowing in the diode D5 becomes zero, a current flows to the auxiliary circuit 22b side via the coil L1 and the diode D5 (see the arrow $D_{m21}$ shown in FIG. 6), whereas the electric charge stored in the snubber capacitor C2 flows to the auxiliary circuit 22b side because of a potential difference between the snubber capacitor C2 and the voltage VL of the fuel cell 110 (see the arrow $D_{m22}$ shown in FIG. 6). The voltage applied to the first switching element S1 is determined according to the capacity of this snubber capacitor C2.

Figure 12:
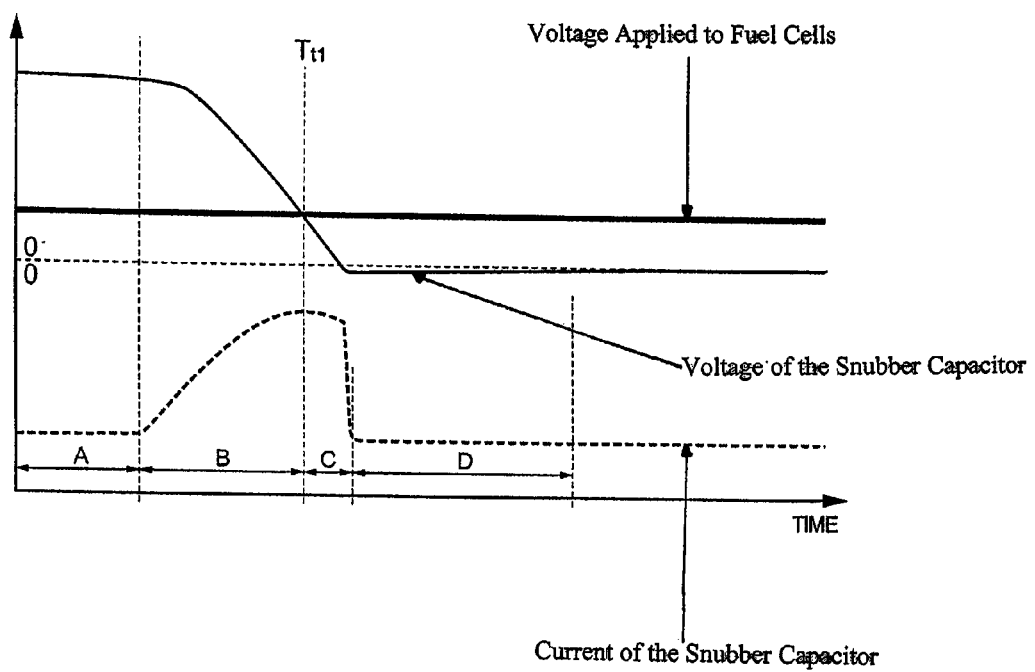
FIG. 12 is a diagram showing the voltage-current behavior in the transition process from mode 2 to mode 3.

FIG. 12 is a diagram showing the voltage-current behavior in the transition process from mode 2 to mode 3, and indicates the voltage applied to the fuel cell 110 by thick solid lines, the voltage of the snubber capacitor C2 by thin solid lines, and the current of the snubber capacitor C2 by broken lines.

After the start of the energization of the path of $D_{m21}$ shown in FIG. 6 (see (A) shown in FIG. 12), the energization of the path of $D_{m22}$ shown in FIG. 6, i.e., the energization of the auxiliary coil L2 is started because of a potential difference between the voltage VH of the snubber capacitor C2 and the voltage VL of the fuel cell 110 (see (B) shown in FIG. 12). As shown in FIG. 12, the current of the snubber capacitor C2 continues to increase until the voltage of the snubber capacitor C2 reaches the voltage VL of the fuel cell 110.

Entering into the details, the electric charge accumulated in the snubber capacitor C2 begins to be regenerated on the power supply side because of a potential difference between the voltage VH of the snubber capacitor C2 and the voltage VL of the fuel cell 110 (the arrow $D_{m22}$ shown in FIG. 6). However, because the initial potential difference is (VH−VL), the flow of the electric charge (discharge) accumulated in the snubber capacitor C2 usually stops when the power supply voltage (namely, the voltage VL of the fuel cell 110) is reached (at the timing $T_{t1}$ shown in FIG. 12). However, due to the characteristic of the auxiliary coil L2 (that is, the characteristic that the coil continues to cause a current to flow), the auxiliary coil L2 continues to cause the electric charge to flow even if the electric charge in the snubber capacitor C2 falls below the voltage VL (see (C) shown in FIG. 12). If Formula (4)' below holds at this time, all of the electric charge of the snubber capacitor C2 flows (is discharged).

$$\frac{1}{2}L \cdot I^2 > \frac{1}{2}C \cdot V^2 \quad (4)'$$

Left side: Energy accumulated in auxiliary coil L2
Right side: Energy remaining in snubber capacitor C2

When the electric charge accumulated in the snubber capacitor C2 has dissipated, the free-wheel operation is performed in the path of $D_{m23}$ shown in FIG. 6 and energization is continued (see (D) shown in FIG. 12). As a result of this, all of the energy accumulated in the auxiliary coil L2 is discharged. The LC resonance stops at half a wave because the anode of the diode D2 is connected to one end of the auxiliary coil L2. For this reason, the snubber capacitor C2 holds 0V after discharge.

The transition time tmode2 from mode 2 to mode 3 is expressed by Formula (5) below:

$$t \bmod e2 = t \bmod e2' \quad (5)$$

$$t \bmod e2' = \pi\sqrt{L2id*C2d} \quad (5)'$$

C2d: Capacity of capacitor C2

(Mode 3: See FIG. 7)

When the operation in which the current flows in the path of $D_{m22}$ shown in FIG. 6 has been finished and the electric charge of the snubber capacitor C2 has dissipated completely or has become a minimum voltage (MIN voltage), the first switching element S1 is turned on and the flow of processing proceeds to S103. Also the voltage applied to the first switching element S1 becomes zero when the voltage of the snubber capacitor C2 has become zero and hence ZVS (Zero Voltage Switching) is realized. In this state, the current Il1 flowing in the coil L1 becomes a sum of the current $I_{dm31}$ flowing to the auxiliary circuit 22b side indicated by the arrow Dm31 and the current $I_{dm32}$ flowing via the first switching element S1 (refer to Formula (6) below).

$$Il1 = Idm31 + Idem32 \quad (6)$$

The current $I_{dm31}$ flowing in the first switching element S1 is determined according to the decrease rate of the current $I_{dm31}$ flowing to the auxiliary circuit 22b. The current change rate of the current $I_{dm31}$ flowing to the auxiliary circuit 22b is expressed by Formula (7). That is, because the current $I_{dm31}$ flowing to the auxiliary circuit 22b side decreases at the change rate of Formula (7), the current flowing in the first switching element S1 does not rise abruptly even when the first switching element 31 is turned on, with the result that ZCS (Zero Current Switching) is realized.

$$\frac{di}{dt} = \frac{-VL}{L2} \quad (7)$$

(Mode 4: See FIG. 8)

Figure 8:
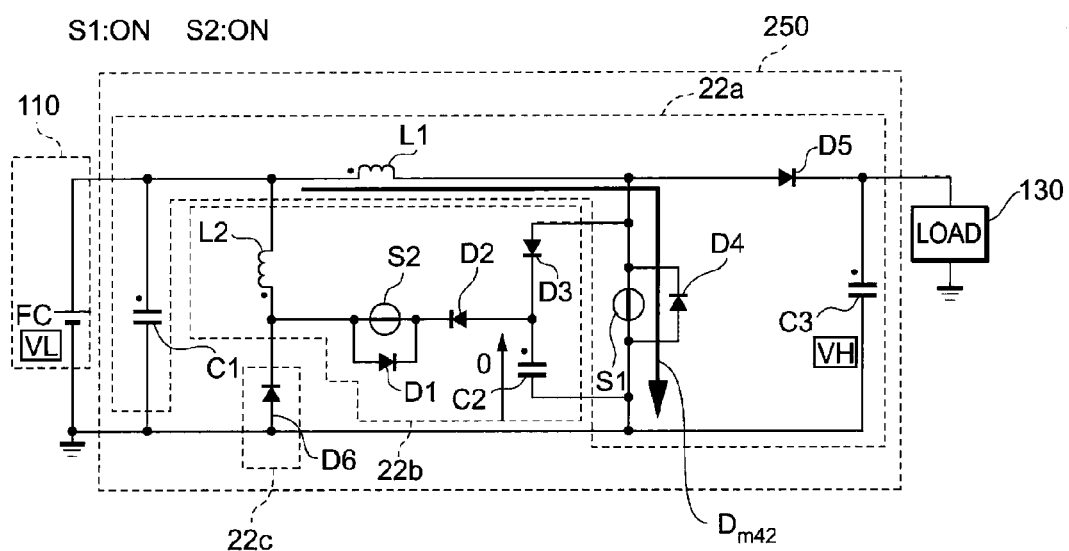
FIG. 8 is a diagram showing the operation of mode 4.

And at Step S104, the state of Step S103 continues, whereby the energy stored in the coil L1 is gradually increased by increasing the amount of current flowing into the coil L1 (see the arrow $D_{m42}$ shown in FIG. 8). In this connection, because of the presence of the diode D2 in the auxiliary circuit 22b, a reverse current does not flow in the auxiliary coil L2 and hence the charging of the snubber capacitor via the second switching element S2 does not occur. Because the first switching element S1 is turned on at this point in time, the charging of the snubber capacitor C2 via the diode D3 does not occur, either. Therefore, the current of the coil L1 becomes the current of the first switching element S1, which gradually increases the energy stored in the coil L1. The turn-on time $T_{s1}$ of the first switching element S1 is approximately expressed by Formula (8) below:

$$Ts1 = (1 - VI/VH) * Tcon \quad (8)$$

Tcon: Control cycle

Incidentally, control cycle refers to the time period of the soft switching process when a series of processes of Step S101 to Step S106 are defined as one cycle.

(Mode 5: See FIG. 9)

Figure 9:
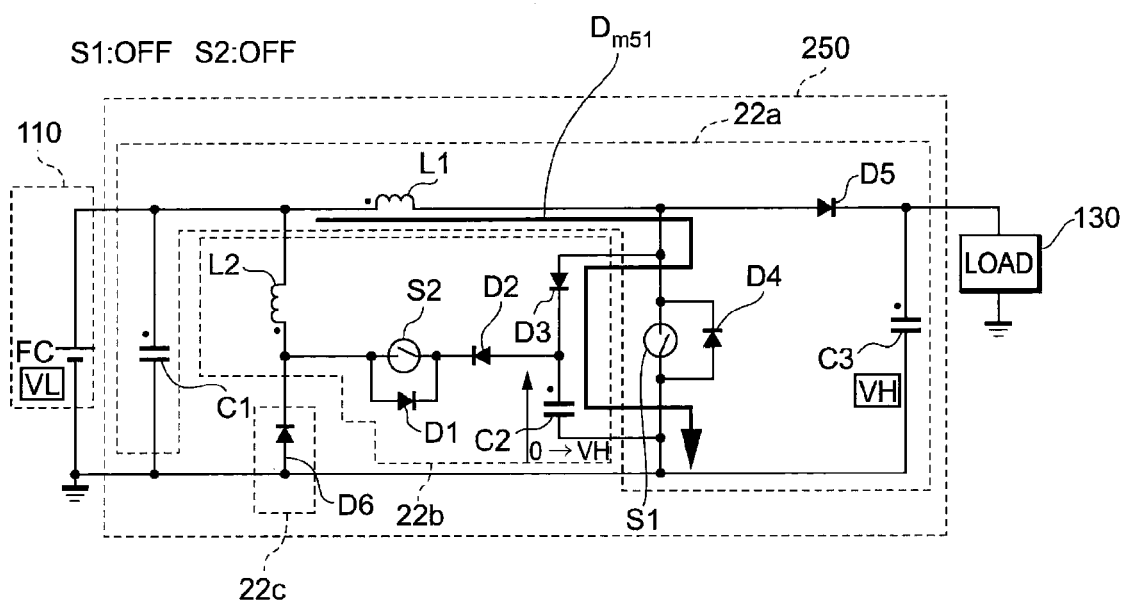
FIG. 9 is a diagram showing the operation of mode 5.
Figure 11:
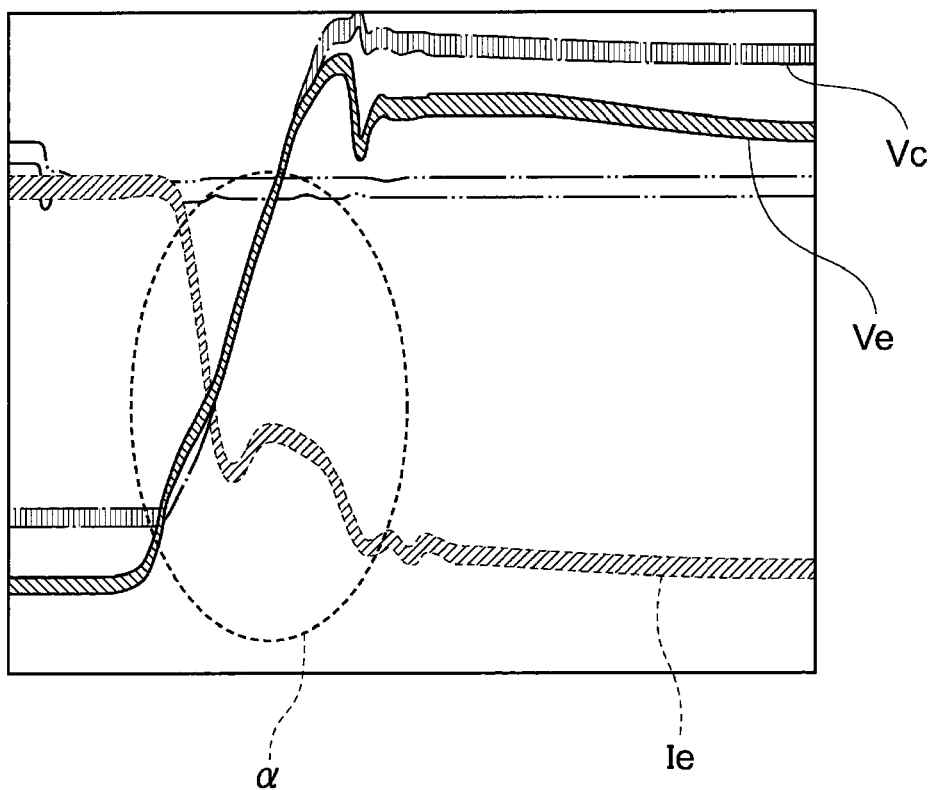
FIG. 11 is a diagram showing the relationship among the voltage Vc of a snubber capacitor C2 of mode 5, the voltage Ve applied to a first switching element S1, and the current Ie flowing in the first switching element S1.

When in Step S104 the desired energy is stored in the coil L1, the first switching element S12 is turned off and a current flows in the path indicated by the arrow $D_{m51}$ in FIG. 9. FIG. 11 is a diagram showing the relationship among the voltage Vc of the snubber capacitor C2 of mode 5, the voltage Ve applied to the first switching element S1, and the current Ie flowing in the first switching element S1. When the above-described switching operation is performed, an electric charge is stored in the snubber capacitor C2 from which the electric charge was dissipated in mode 2, and as a result of this, the voltage Vc of the snubber capacitor C2 increases toward the converter output voltage VH of the FC soft switching converter 250. At this time, the increase rate of the voltage Ve applied to the first switching element S1 is suppressed by the charging of the snubber capacitor C2 (that is, the rise of the voltage slows down), with the result that it becomes possible to perform the ZVS operation which reduces switching losses in the region where a tail current is present in the current Ie flowing in the first switching element S1 (see a shown in FIG. 11).

(Mode 6: See FIG. 10)

Figure 10:
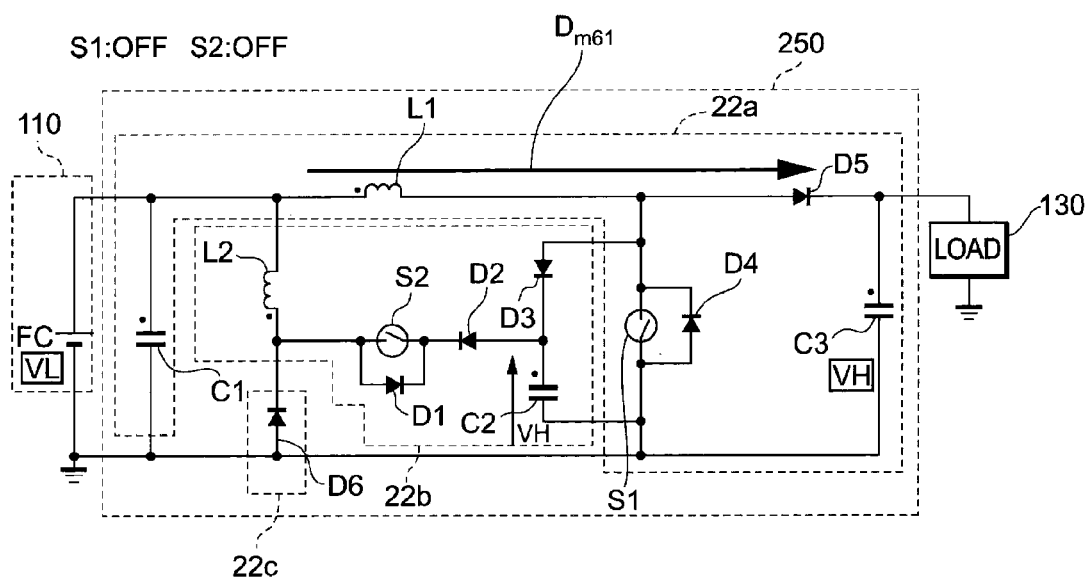
FIG. 10 is a diagram showing the operation of mode 6.

When the voltage of the snubber capacitor C2 has been charged up to the voltage VH, the energy stored in the coil L1 is released to the load 130 side (see the arrow $D_{m61}$ shown in FIG. 10). The turn-off time Ts2 of the first switching element S1 is approximately expressed by Formula (9) below:

$$Ts2 = (VL/VH) * Tcon \quad (9)$$

By performing the above-described soft switching process, it becomes possible to increase the output voltage of the fuel cell 110 to the desired voltage and to supply the voltage to the load 130 after reducing switching losses of the FC soft switching converter 250 as far as possible.

<On-Trouble Judgment of Second Switching Element S2>

Figure 13:
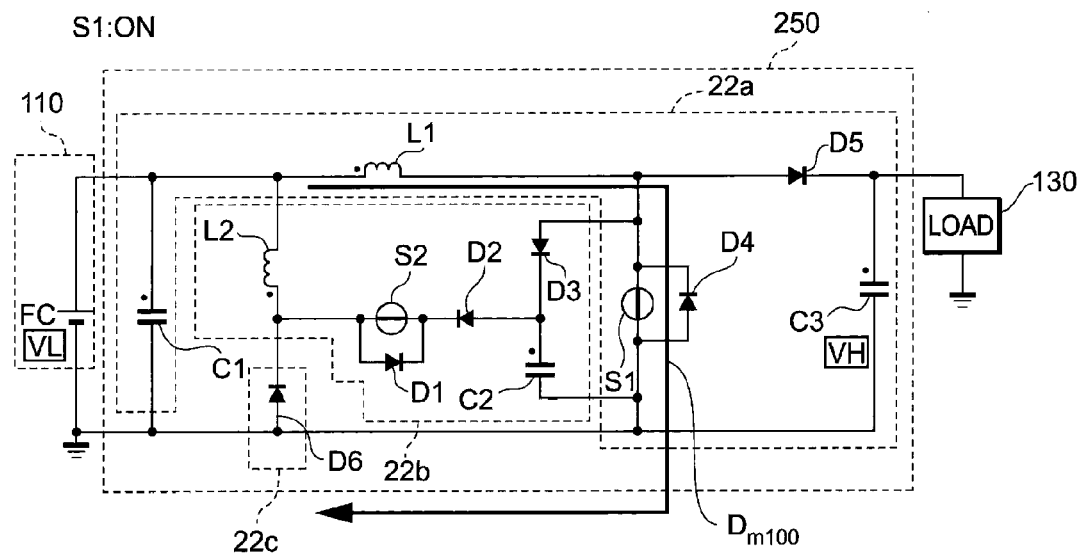
FIG. 13 is a diagram showing the flow of current observed when an on-failure of a second switching element occurs.
Figure 14:
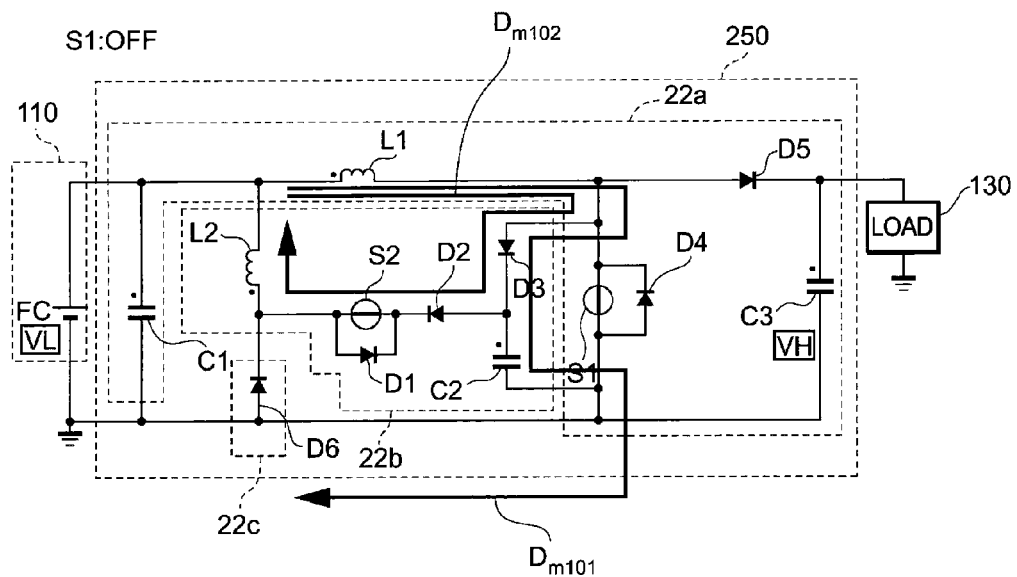
FIG. 14 is a diagram showing the flow of current observed when an on-failure of the second switching element occurs.

FIGS. 13 and 14 are diagram to explain the mechanism by which a back-flow current is generated when an on-failure occurs.

First, when the first switching element S1 becomes on, the current path of coil L1→switching element S1 (see the arrow $D_{m100}$ of FIG. 13) occurs and the current flowing in the coil L1 increases. And when this first switching element S1 becomes off, a current flows in the path indicated by the arrow $D_{m101}$ of FIG. 14 and the an electric charge is stored in the snubber capacitor C2, whereby the voltage Vc of the snubber capacitor C2 increases. At this time, because the second switching element S2 is in an on state, a short occurs at both ends of the coil L1 and a back-flow current Ire is generated in the short-circuit path indicated by the arrow Dm102 of FIG. 14.

The first switching element S1 repeats on-off operations according to a duty command (for example, duty 50%) given by the controller 160, and because of the on-off operations of the first switching element S1 the current flowing in the coil L1 continues to increase.

Figure 15:
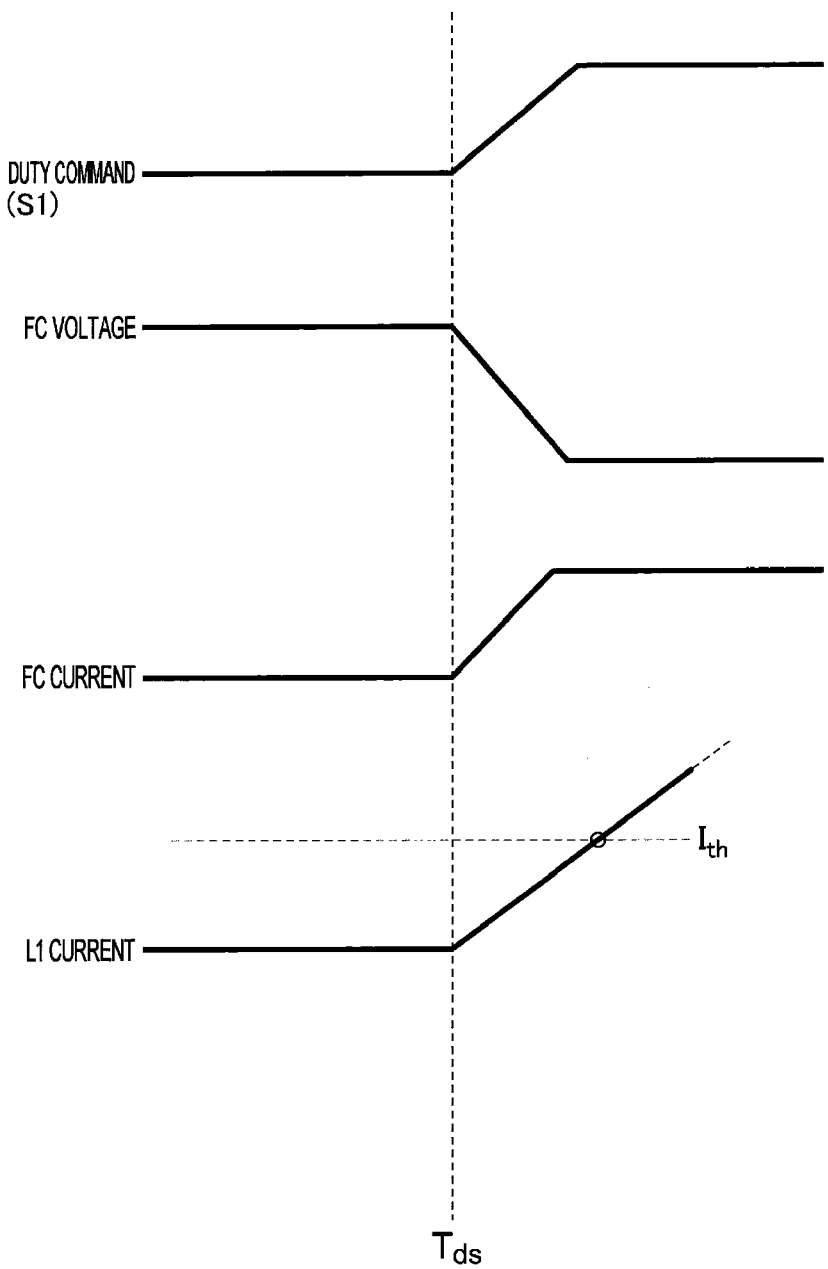
FIG. 15 is a diagram showing a duty command to the first switching element S1 which is given when an on-failure of the second switching element occurs, and the generation of the FC voltage, the FC current, and the current flowing in a coil L1.

FIG. 15 is a diagram showing a duty command to the first switching element S1 which is given when an on-failure occurs, and the generation of the FC voltage, the FC current, and the current flowing in the coil L1.

When the controller 160 starts the duty command to the first switching element S1 (see $T_{ds}$ shown in FIG. 15), the FC voltage decreases and the FC current increases.

On the other hand, the current flowing in the coil L1 continues to increase because of alternate repetition of the flow of the currents shown in FIGS. 13 and 14.

The controller 160 sequentially detects the current flowing in the coil L1 (hereinafter referred to as the L1 current) through the use of the current sensor Si1, and makes a judgment as to whether or not the detected L1 current has exceeded the overcurrent threshold value $I_{th}$ stored in the memory (not shown). When the controller 160 judges that the detected L1 current has exceeded the overcurrent threshold value $I_{th}$, the controller 160 judges that the second switching element S2 has an on-failure, and performs a fail-safe operation by stopping the driving of the converter 250 of the auxiliary circuit 22b provided with this second switching element S2 (for example, the U-phase converter). Incidentally, it is necessary only that the overcurrent threshold value $I_{th}$ be a value exceeding a range (including tolerances and variations) capable of being provided for the duty command given to the coil L1, the FC current and the FC voltage, and this overcurrent threshold value $I_{th}$ can be found by conducting experiments and the like beforehand. The on-failure judgment process of the second switching S2 will be described below with reference to FIG. 16.

Figure 16:
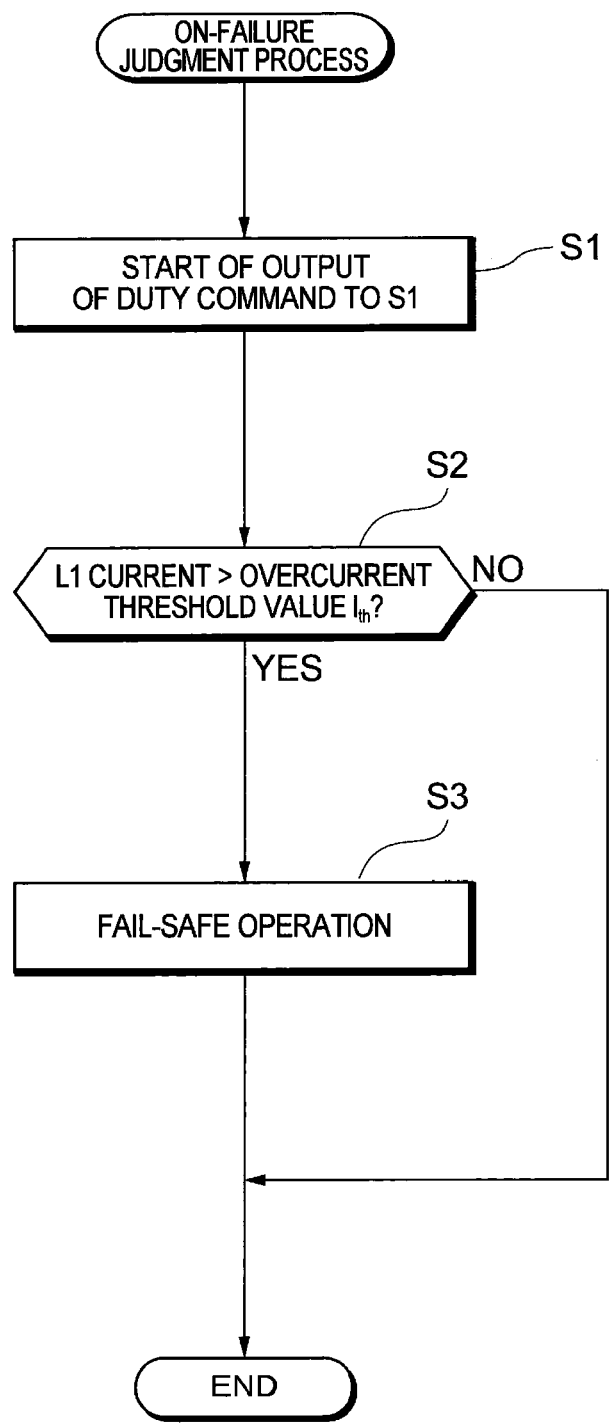
FIG. 16 is a flowchart showing the on-failure judgment process of this embodiment.

FIG. 16 is a flowchart showing the on-failure judgment process of the second switching element S2 in the auxiliary circuit 22b executed by the controller 160.

When the controller 160 starts the output of a duty command to the switching element S1 (Step S1), the controller 160 starts the detection of the L1 current using the current sensor Si1 and makes a comparison between the L1 current and the overcurrent threshold value $I_{th}$ (Step S2). When the detected L1 current is less than the overcurrent threshold value $I_{th}$, the controller 160 judges that the second switching element S2 is operating normally and completes the process.

On the other hand, when the detected L1 current is not less than the overcurrent threshold value $I_{th}$, the controller (judgment means) 160 judges that an on-failure occurs in the second switching element S2 and performs a fail-safe operation (Step S3) by stopping the driving of the converter 250 (for example, the U-phase converter) of the auxiliary circuit 22b provided with this second switching element S2, and finishes the process. Incidentally, when the driving of a specific phase (for example, the U-phase converter) has been stopped due to the occurrence of an on-failure, all that is needed is to perform driving by using the remaining phases (for example, either or both of the V-phase converter and the W-phase converter).

As is well known, if an overcurrent is generated in the coil L1, this poses problems, such as the inducement of fractures of surrounding elements due to abnormal overheating in the worst case. Therefore, in this embodiment, the driving is stopped for the converter of the phase for which it was judged that as described above, an on-failure occurred in the second switching element S2 of the auxiliary circuit 22b. As a result of this, it becomes possible to prevent problems such as the overheating of the auxiliary circuit element.

B: Examples of Modification

Example of Modification 1

In the above-described embodiment, it is judged that an on-failure has occurred in the second switching element S2 by detecting that an overcurrent has been generated in the coil L1 (in other words, by detecting that the L1 current has exceeded the overcurrent threshold value $I_{th}$). However, the gist of the embodiment is not limited to this. For example, a judgment may be made as to whether or not an on-failure has occurred in the second switching element S2 by providing a temperature sensor which detects the temperature of an element (or a plurality of elements) in which the back-flow current shown in FIG. 14 flows, for example, the coil L1, the coil L2 and the switching element S2, and by making a judgment as to whether or not the element temperature detected by this temperature sensor has exceeded the abnormal overheating threshold value (threshold temperature) $T_{th}$ stored in a memory (not shown).

Figure 17:
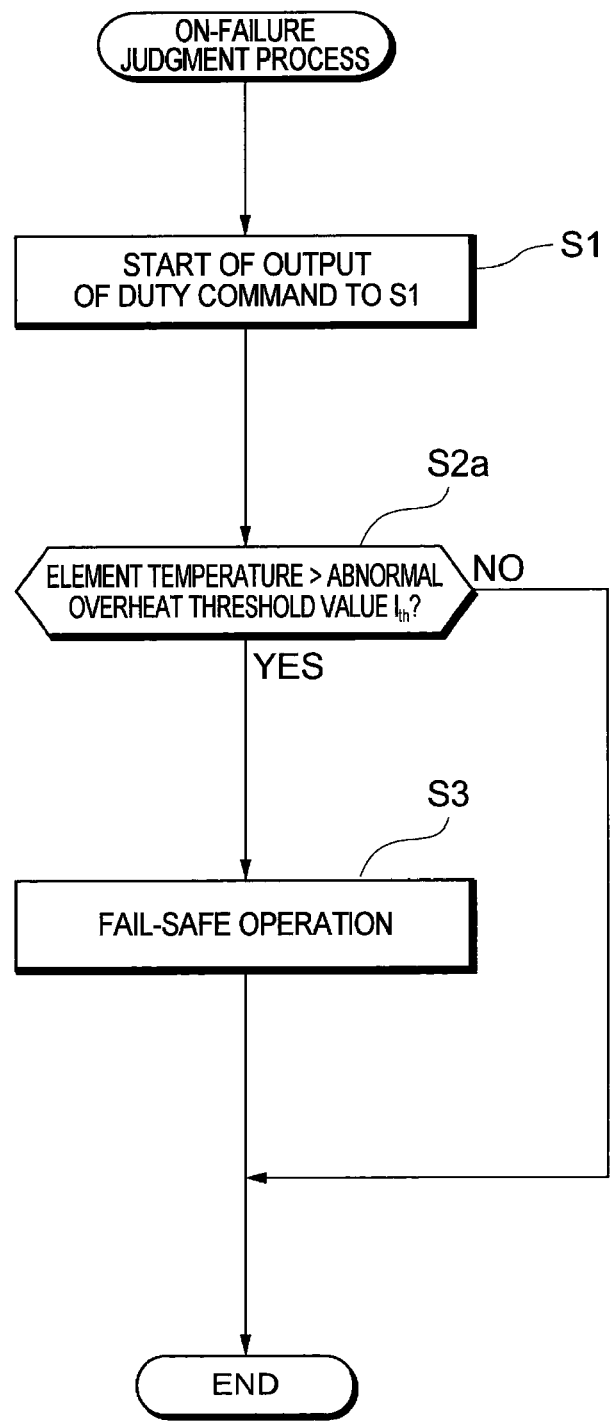
FIG. 17 is a flowchart showing the on-failure judgment process of the example of variation 1.

FIG. 17 is a flowchart showing the on-failure judgment process of the second switching element S2 in the auxiliary circuit 22b executed by the controller 160 in an example of modification 1. Parts corresponding to the steps shown in FIG. 16 are designated by the same reference signs and the description of these parts is omitted.

When the controller 160 starts the output of a duty command to the switching element S1 (Step S1), the controller 160 starts the detection of the element temperature of at least one or more of the coil L1, the coil L2 and the second switching element S2 using the temperature sensor and makes a comparison between the detected element temperature and the abnormal overheating threshold value $T_{th}$ (Step Sa2).

When the element temperature detected by the temperature sensor is less than the abnormal overheating threshold value $T_{th}$ stored in a memory (not shown), the controller 160 judges that the second switching element S2 is operating normally and completes the process. On the other hand, when the controller (judgment means) detects that the detected element temperature has exceeded the abnormal overheating threshold value $T_{th}$, the controller judges that an on-failure occurred in the second switching element S2 and performs a fail-safe operation (Step S3) by stopping the driving of the converter 250 (for example, the U-phase converter) of the auxiliary circuit 22b provided with this second switching element S2, and finishes the process.

Example of Modification 2

And a judgment may be made as to whether or not an on-failure has occurred in the second switching element S2 on the basis of the current on the output side of the converter. As shown in FIGS. 13 and 14, when an on-failure has occurred in the second switching element S2, the current stops flowing from the converter in question toward the load 130. Therefore, in the example of modification 2, for example, a current sensor (not shown in the figure, hereinafter referred to as the output current sensor) is provided between the diode D5 and the load 130, and the current on the outside of the converter (hereinafter referred to as the converter output current) is detected through the use of this output current sensor. When the converter output current detected by the output current sensor does not exceed the normal current lower limit (normal current threshold value) $I_{nth}$ stored in the memory, it can be judged that an on-failure has occurred in the second switching element S2. Incidentally, the normal current lower limit can be found separately by conducting experiments and the like.

Figure 18:
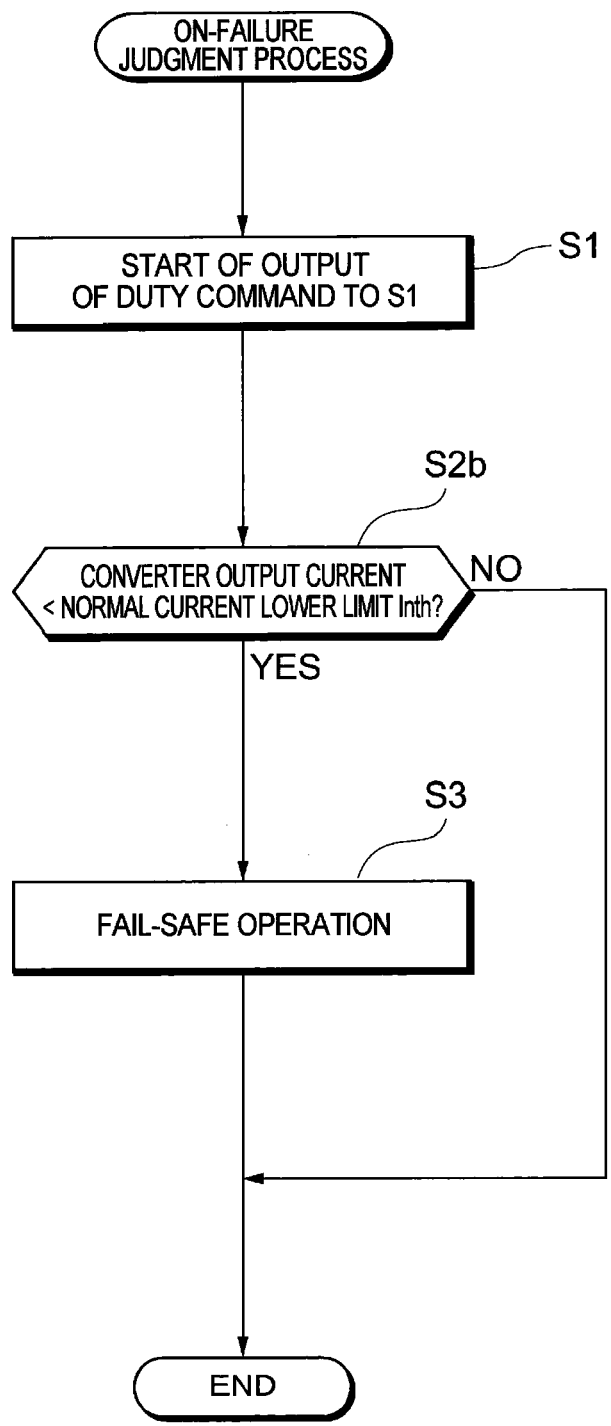
FIG. 18 is a flowchart showing the on-failure judgment process of the example of variation 2.

FIG. 18 is a flowchart showing the on-failure judgment process of the second switching process S2 in the auxiliary circuit 22b executed by the controller 160 in the example of variation 2. Parts corresponding to the steps shown in FIG. 16 are designated by the same reference signs and the description of these parts is omitted.

When the controller 160 starts the output of a duty command to the switching element S1 (Step S1), the controller 160 starts the detection of the converter output current using the output current sensor and makes a comparison between the converter output current and the normal current lower limit $I_{nth}$ (Step Sb2). When the converter output current detected by the output current sensor exceeded, within a prescribed time, the normal current lower limit $I_{nth}$ stored in a memory (not shown), the controller 160 judges that the second switching element S2 is normal, and finishes the process. On the other hand, when the detected converter output current does not exceed, within a prescribed time, the normal current lower limit $I_{nth}$ stored in a memory (not shown), the controller (judgment means) judges that an on-failure has occurred in the second switching element S2, and performs a fail-safe operation (Step S3) by stopping the driving of the converter 250 of the auxiliary circuit 22b provided with this second switching element S2 (for example, the U-phase converter).

Example of Modification 3

Figure 19:
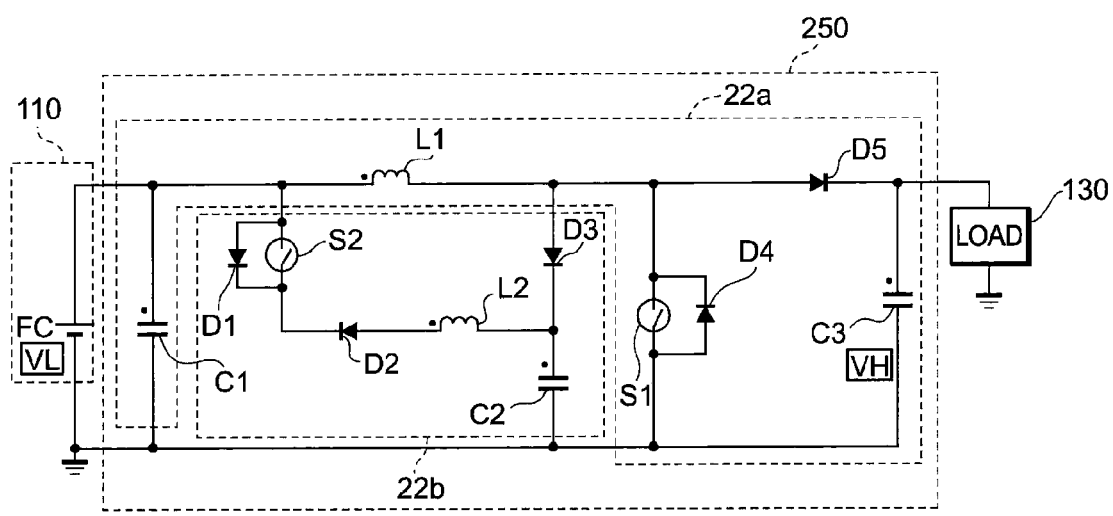
FIG. 19 is a diagram showing another configuration.

In this embodiment described above, as the second series-connected body included in the auxiliary circuit 22b, the description was given of the example in which the anode terminal of the anode D2 is connected to the connecting portion between the diode D3 of the first series-connected body and the snubber capacitor C2, and the cathode terminal of the diode D2 is connected to the pole of one end of the second switching element (auxiliary switch) (see FIG. 3). However, for the circuit topology of this second series-connected body, it is possible to adopt an aspect in which the series order of a switching circuit by the coil L2, the diode D2, the second switching element S2 and the like is appropriately interchanged. Specifically, as shown in FIG. 19, it is possible to adopt an aspect in which the free-wheel circuit 22c is removed and the order of a switching circuit by the coil L2, the second switching element S2 and the like is interchanged.

REFERENCE SIGNS LIST

100: FCHV system, 110: Fuel cell, 120: Battery, 130: Load, 140: Inverter, 2500: FC converter, 160: Controller, 170: Sensor group, 180: Battery converter, 250: FC soft switching converter, 22a: Main boost circuit, 22b: Auxiliary circuit, 22c: Free-wheel circuit, S1, S2: Switching element, C1, C3: Smoothing capacitor, C2: Snubber capacitor, L1, L2: Coil, D1, D2, D3, D4, D5: Diode, D6: Free-wheel diode

The invention claimed is:

1. A converter control device of a soft switching converter provided with a main booster circuit and an auxiliary circuit, which controls output voltage of a fuel cell, comprising:
   a current sensor which detects current flowing in a main coil constituting the main booster circuit;
   a controller programmed to perform a judgment process which judges that an auxiliary switch constituting the auxiliary circuit has an on-failure when the current detected by the current sensor exceeds a set overcurrent threshold value and programmed to perform a fail-safe operation which stops operation of the main booster circuit when it is judged that the auxiliary switch has the on-failure, wherein the main booster circuit has:
the main coil, one end of which is connected to a terminal on a high-potential side of the fuel cell;
a main switch which performs switching, one end of which is connected to the other end of the main coil and the other end of which is connected to a terminal on a low-potential side of the fuel cell;
a first diode whose anode is connected to the other end of the main coil; and
a smoothing capacitor provided between the cathode of the first diode and the other end of the main switch, and
wherein the auxiliary circuit has:
a first series-connected body including a second diode and a snubber capacitor which are connected in parallel to the main switch and connected to the other end of the main coil and a terminal on the low-potential side of the fuel cell; and
a second series-connected body including a third diode, an auxiliary coil and the auxiliary switch which are connected between a connecting portion between the second diode and the snubber capacitor and the one end of the main coil.

* * * * *

UNITED STATES PATENT AND TRADEMARK OFFICE
CERTIFICATE OF CORRECTION

PATENT NO. : 9,024,598 B2  
APPLICATION NO. : 13/379917  
DATED : May 5, 2015  
INVENTOR(S) : T. Hasegawa et al.

Page 1 of 1

It is certified that error appears in the above-identified patent and that said Letters Patent is hereby corrected as shown below:

In the specification

At column 7, Formula (4), change "$tmode1 = \max(I_p - \frac{\Delta I}{2} . 0)$" to -- $tmode1 = \max(I_p - \frac{\Delta I}{2}, 0)$ --.

At column 8, Formula (5), change "$t \bmod e2 = t \bmod e2'$" to -- $t\,mode2 = t\,mode2'$ --.

At column 8, Formula (5'), change "$t \bmod e2' =$" to -- $t\,mode2' =$ --.

Signed and Sealed this  
Twenty-ninth Day of December, 2015

Michelle K. Lee  
*Director of the United States Patent and Trademark Office*